Patented June 6, 1939

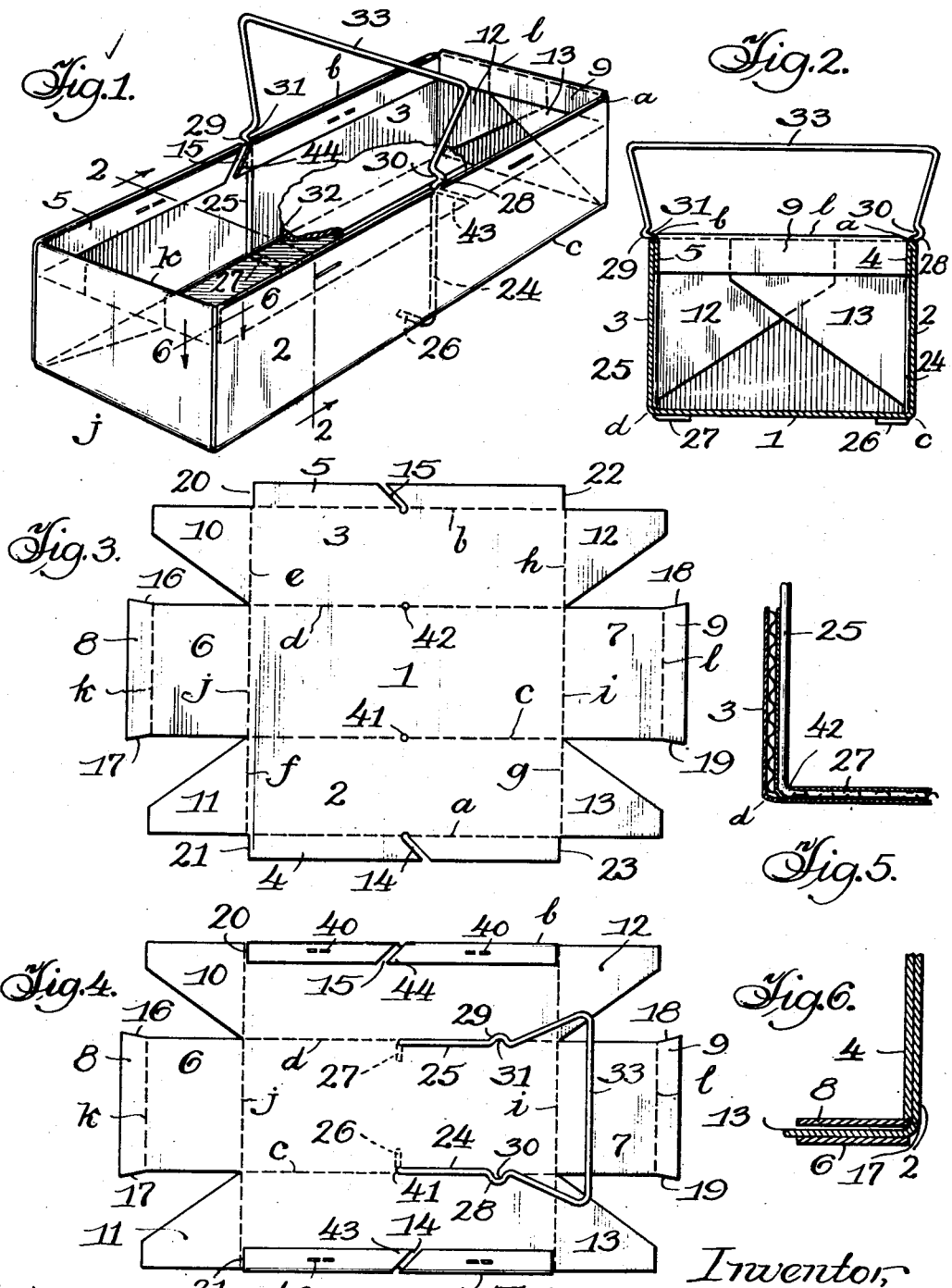

2,161,639

UNITED STATES PATENT OFFICE 2,161,639

BASKET

Edmund T. H. Schmidt, Chicago, Ill.

Application August 9, 1937, Serial No. 158,031

10 Claims. (Cl. 229—34)

This invention relates to baskets and more particularly a folding or collapsible basket, and a handle therefor.

Among the objects of my invention is to provide a basket of folding type which may be made of corrugated or solid board and stacked or piled in flat condition for economical shipping or storing, as compared with set-up or nested baskets.

A further object is to produce a firm basket having a one-piece, firm and rigid wire handle having its bottom ends inserted through two holes at each side of the bottom and extended either into the inside of corrugated material or below corrugated material or solid material to have a bearing against the bottom face thereof if desired.

A still further object is to provide in a basket of the kind described a wire handle having in each vertical leg a shoulder approximately midway of each of such legs whereby the handle will be firmly held on the upper edges of the basket.

Further to provide a foldable basket having a one-piece wire handle which may be properly connected with the bottom and then brought into vertical position and inserted into appropriate slots at the middle of the upper flange to insure a rigid support, and which will keep the handle in vertical position when the basket is set up.

Another object is to provide in baskets a handle having curved portions immediately above the upper edge of the basket sides to firmly hold in position a lid if desired.

A further object is to provide novel end construction in a basket to facilitate the quick assembly of the ends with the sides in such manner as to provide great strength, simplicity and positiveness in assembling, as well as to permit the basket to again be knocked down if desired.

A still further object is to provide a foldable basket which before folding is flat to facilitate printing thereon on either or both sides.

Another object is to provide a basket of the kind described that is economical to manufacture, that may be easily and quickly assembled, strong after being assembled, provided with a strong and convenient handle, and one that may be disassembled or knocked down after use if desired.

Other objects, advantages and capabilities inherent in my improved basket will later more fully appear.

My invention further resides in the combination, construction and arrangement of parts illustrated in the accompanying drawing, and while I have shown therein for illustrative purposes a preferred embodiment, I wish it understood that the same is susceptible of modification and change without departing from the spirit of my invention.

In the drawing:

Fig. 1 is a perspective view of a basket embodying my invention and showing the basket in assembled form.

Fig. 2 is a transverse vertical cross-section taken on the line 2—2 of Fig. 1 and looking in the direction of the arrows.

Fig. 3 is a plan view of the blank from which my improved basket is made, and showing the blank laid out flat before any folds are made therein.

Fig. 4 is a view similar to Fig. 3 but showing the one piece wire handle in place before being swung to vertical position and after the upper edge portions of the sides have been folded over and stapled in position.

Fig. 5 is a fragmentary vertical transverse section through a bottom corner of the basket at one of the handles, and showing the bottom end of the latter passing into the interior of the corrugated bottom.

Fig. 6 is a fragmentary longitudinal horizontal section on the line 6—6 of Fig. 1.

Referring in detail to the drawing, my improved basket is made from a blank of corrugated or solid fibre board shown in flat condition in Fig. 3, before any folding has been done. This flat blank is cut or stamped into the shape shown and comprises preferably in integral formation (although a plurality of flat parts could be fastened together if desired without departing from the spirit of my invention) the bottom portion 1, the side portions 2 and 3, the upper side edge flaps 4 and 5, the outside end flaps 6 and 7 with their corresponding upper edge flaps 8 and 9, and the side end flaps 10, 11, 12 and 13. The upper side edge flaps are formed with the oppositely extending slots 14 and 15, which extend at an angle from the free edge into the fold lines a and b. The end extremities 16, 17, 18 and 19 of the upper edge flaps 8 and 9 are cut at a slight angle to better insure their interlocking behind the ends 20, 21, 22 and 23 of the side edge flaps 4 and 5 when in assembled position.

The handle is preferably formed from a single piece of wire of the shape shown in Figs. 1, 2 and 4, and comprises the side legs 24 and 25 formed with the rectangularly bent inwardly extending bottom extensions 26 and 27, respectively. The side legs of the handle are each formed approximately midway at a height just immediately above the upper edges of the side portions 2 and 3 with a kink or double bend to form on the outer side of the leg a pair of shoulders 28 and 29 to snugly take over the upper edge of the side portions when assembled, and to form on their insides a pair of recesses 30 and 31 to receive the side edges of a lid 32 therebetween when a lid is used. The side legs of the handle above the shoulders 28 and 29 preferably extend upwardly and outwardly at a slight angle and are joined together at their upper ends by the handle bar 33.

In assembling this basket the upper side edge flaps 4 and 5 are turned upwardly as viewed in Fig. 3, along the fold lines a and b, to bring them flatly against the inner faces of the side wall portions 2 and 3 as shown in Fig. 4, in which position they are secured by staples 40 or the like, one or more on each side of slots 14 and 15, in order to give added rigidity to the walls forming said slots. As seen in Fig. 4, these two slots are arranged to extend on opposite sides of a transverse line passing through their outer ends, whereby the side legs of the handle will be held more firmly in position.

The side legs 24 and 25 of the handle are next inserted through holes 41 and 42, respectively, on each side of the transverse middle of the bottom section 1, so that the angular foot extensions 26—27 may extend entirely through the material of the bottom section and bear upwardly against the lower face of the bottom of the basket as shown in Fig. 2, or if the basket is made of corrugated fibre board the angular foot extensions 26 and 27 may be inserted into the interior of the corrugated bottom sheet as shown in Fig. 5. The arrangement shown in Fig. 2, however, is preferred and will give greater strength, although the arrangement shown in Fig. 5 would be more sightly due to the concealment of the extension feet. The handle will now be in the position shown in Fig. 4, or moved a little nearer to the vertical if desired.

The side wall portions 2 and 3 will next be folded upwardly along the horizontal fold lines c and d to substantially a vertical position, and the side end flaps 10, 11, 12 and 13 folded inwardly along the vertical fold lines e, f, g and h, so as to stand substantially at right-angles to the side wall portions. Next the outer end wall portions 6 and 7 will be folded upwardly along the horizontal fold lines i and j to bear against and form support for the inside end flaps 10—13. Next the upper edge flaps 8 and 9 will be folded inwardly along the fold lines k and l, over the upper edges of flaps 10—13, and brought to a substantially vertical position along the inner faces thereof, and the slightly outwardly inclined ends 16—19 then tucked or pushed in behind the ends of the upper side edge flaps 4 and 5, which will firmly hold them in position and flaps 10—13 in place.

Lastly, the handle will be moved to substantially vertical position, and the side legs 24 and 25 forced into slots 14 and 15 and under the angular projections 43 and 44 of the upper edge side flaps 4 and 5. Due to these slots extending angularly in opposite directions this will require putting the handle under a little strain when inserting the side legs into these slots, which when the handle is finally in place, as shown in Figs. 1 and 2, would likewise require force to get them out. This insures that the handle will normally stay in proper position with relation to the basket, and due to the foot extensions will support a considerable load in the basket.

The shoulders 28 and 29 on the handle side arms are so positioned that when these side arms are being inserted into slots 14 and 15, and when in final position, they will bear somewhat against the upper edges of the side wall portions 2 and 3, thus giving further rigidity to the basket as a whole. Also, if a lid is used, its side edges will seat within the recesses 30 and 31 of the handle and be held in position on the basket. As will be seen in Figs. 1, 2, 4 and 5, the side arms of the handle occupy a position against the inner faces of the side wall members 2 and 3, and are held thereagainst by the angular projections 43 and 44 of slots 14 and 15, in conjunction with shoulders 28 and 29 of the handle, which bear against the upper edges of the side walls. If desired, openings may be provided in any one or all of the walls of the basket for ventilating purposes.

Having now described by invention, I claim:

1. A basket folded into form from a single flat piece of fibre board cut to desired shape, comprising a bottom, side and end walls, an inturned flap along the upper edge of each of the side walls, said flaps each having an open ended slot formed intermediate its ends, and a handle having supporting connection with the basket and being positioned in said slots, said slots, being formed at an angle with relation to the vertical when the bottom of the basket is substantially in a horizontal plane.

2. A basket folded into form from a single flat piece of fibre board cut to desired shape, comprising a bottom, side and end walls, an inturned flap along the upper edge of each of the side walls, said flaps each having an open ended slot formed intermediate its ends, and a handle having supporting connection with the basket and being positioned in said slots, said slots being formed at an angle with relation to the vertical when the bottom of the basket is substantially in a horizontal plane and reversely positioned with relation to each other.

3. A basket formed from fibre board or the like, comprising bottom, side and end walls, an inwardly folded flap secured along the upper edge of each of the side walls, said side walls each having at each end an integral inwardly folded end flap, said end walls each having a top flap folded over said end flaps and positioned behind the ends of said first-mentioned flaps, each of said first-mentioned flaps being formed with a slot, and a wire handle secured to the basket and passing through each of said slots.

4. A basket formed from fibre board or the like, comprising bottom, side and end walls, an inwardly folded flap secured along the upper edge of each of the side walls, said side walls each having at each end an integral inwardly folded end flap, said end walls each having a top flap folded over said end flaps and positioned behind the ends of said first-mentioned flaps, each of said first-mentioned flaps being formed with a slot, and a wire handle secured to the basket and passing through each of said slots, said slots being angularly positioned with relation to each other.

5. A basket formed from fibre board or the like, comprising bottom, side and end walls, an inwardly folded flap secured along the upper edge of each of the side walls, said side walls each having at each end an integral inwardly folded end flap, said end walls each having a top flap folded over said end flaps and positioned behind the ends of said first-mentioned flaps, each of said first-mentioned flaps being formed with a slot, and a wire handle secured to the basket and passing through each of said slots, said slots being angularly positioned with relation to each other, said handle also extending downwardly to and having supporting connection with the bottom of the basket.

6. A basket formed from fibre board or the like, comprising bottom, side and end walls, an inwardly folded flap secured along the upper edge of each of the side walls, said side walls each having at each end an integral inwardly folded end flap, said end walls each having a top flap folded over said end flaps and positioned behind the ends of said first-mentioned flaps, each of said first-mentioned flaps being formed with a slot, and a wire handle secured to the basket and passing through each of said slots, said slots being angularly positioned with relation to each other, said handle also extending downwardly to and having supporting connection with the bottom of the basket, said handle being provided with outwardly extending shoulders adapted to frictionally engage against the upper edge of each of the side walls of the basket.

7. A basket formed from fibre board or the like, comprising bottom, side and end walls integrally and foldably connected together, an inturned flap on the upper edge of each of the side walls and secured against the inner face thereof, each of said flaps being formed with an inclined open ended slot adjacent the middle of the length of the basket, the inclination of each of said slots being in an opposite direction from that of the other, a wire handle having side legs and foot portions, said foot portions having supporting contact with the bottom of the basket and said side legs extending into said slots.

8. A basket formed from fibre board or the like, comprising bottom, side and end walls, each of the side walls having at its upper edge an inturned flap lying along the inner face of the side wall, each of said flaps being formed with an inclined slot, the inclination of said slots extending in opposite directions, a wire handle having a pair of foot portions and a pair of side legs, said foot portions being mounted in supporting engagement with relation to the bottom of the basket, and said side legs being inserted in said slots, each of said side legs being formed with an outwardly extending shoulder to tightly engage the upper edge of the side walls when the side legs are positioned in said slots, each of said side walls being provided at its ends with inturned end flaps, said end walls having downturned top flaps, said end flaps being positioned between said end wall top flaps and the end walls, said end wall top flaps each having each of its ends positioned and held back of the end edge of said side wall flap.

9. A basket formed from fibre board or the like comprising bottom, side and end walls, each of said side walls having an inturned flap, a wire handle having side legs and feet portions, said flaps each having an inclined slot formed therein adjacent the middle of its length, each of said slots being open at the free edge of the flap, said feet portions having supporting contact with the bottom of the basket, said side legs being inserted in said slots, the inclination of one of said slots being toward one end of the basket and the inclination of the other slot being toward the other end of the basket, and said handle having an outwardly extending shoulder on each of the side legs thereof to engage the upper edge of the side walls at said slots.

10. In an article of manufacture an integral flat blank of fibre board or the like cut to desired shape and adapted to be folded into basket form comprising a bottom, side and end walls, a flap along the upper edge of each of the side walls, a wire handle having side legs and feet portions, said feet portions each extending through a hole in the bottom wall and having supporting contact with the bottom of the bottom wall, all so arranged that said flat pieces can be stacked flat one on the other with the handles swung down to lie flat against their respective flat piece for shipping, said flaps each having an inclined slot formed therein and open at the free edge of the flap, the inclination of said slots being in opposite directions longitudinally of said bottom wall, the parts all so arranged that the basket can be folded into final form and the side legs of the handle inserted into said slots to hold the parts in said final form.

EDMUND T. H. SCHMIDT.